United States Patent
Ahn et al.

(10) Patent No.: US 9,439,135 B2
(45) Date of Patent: Sep. 6, 2016

(54) METHOD AND WIRELESS DEVICE FOR MONITORING CONTROL CHANNEL

(75) Inventors: Joon Kui Ahn, Anyang-si (KR); Suck Chel Yang, Anyang-si (KR); Dong Youn Seo, Anyang-si (KR); Han Byul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 153 days.

(21) Appl. No.: 14/131,153

(22) PCT Filed: Jul. 18, 2012

(86) PCT No.: PCT/KR2012/005744
§ 371 (c)(1),
(2), (4) Date: Jan. 6, 2014

(87) PCT Pub. No.: WO2013/012254
PCT Pub. Date: Jan. 24, 2013

(65) Prior Publication Data
US 2014/0146769 A1    May 29, 2014

Related U.S. Application Data

(60) Provisional application No. 61/508,696, filed on Jul. 18, 2011.

(51) Int. Cl.
*H04W 48/16* (2009.01)
*H04L 5/00* (2006.01)
*H04W 72/04* (2009.01)
*H04W 24/00* (2009.01)
*H04B 17/309* (2015.01)
*H04B 7/04* (2006.01)

(52) U.S. Cl.
CPC ............ *H04W 48/16* (2013.01); *H04B 17/309* (2015.01); *H04L 5/0023* (2013.01); *H04L 5/0048* (2013.01); *H04L 5/0053* (2013.01); *H04W 24/00* (2013.01); *H04W 72/0406* (2013.01); *H04B 7/04* (2013.01)

(58) Field of Classification Search
CPC ........... H04W 48/12; H04W 72/1278; H04W 72/1289; H04W 74/002; H04W 74/006; H04W 24/02; H04B 7/024; H04B 7/0413; H04B 7/0452
See application file for complete search history.

(56) References Cited

U.S. PATENT DOCUMENTS

| | | | |
|---|---|---|---|
| 2010/0061360 A1* | 3/2010 | Chen et al. | 370/342 |
| 2011/0075624 A1 | 3/2011 | Papasakellariou et al. | |
| 2011/0269442 A1 | 11/2011 | Han et al. | |
| 2011/0299489 A1 | 12/2011 | Kim et al. | |
| 2012/0039180 A1 | 2/2012 | Kim et al. | |
| 2012/0044821 A1 | 2/2012 | Kim et al. | |
| 2012/0057490 A1 | 3/2012 | Park et al. | |

(Continued)

FOREIGN PATENT DOCUMENTS

| | | |
|---|---|---|
| KR | 10-2010-0096035 A | 9/2010 |
| KR | 10-2011-0122034 A | 11/2011 |
| WO | WO 2010/068069 A2 | 6/2010 |

(Continued)

*Primary Examiner* — Benjamin H Elliott, IV
(74) *Attorney, Agent, or Firm* — Birch, Stewart, Kolasch & Birch, LLP

(57) ABSTRACT

Provided are a method of monitoring a control channel in a multiple antenna system, in which a plurality of layers are defined, and a wireless device using same. The wireless device monitors the control channel in a search layer that is selected from the plurality of layers.

12 Claims, 11 Drawing Sheets

(56) References Cited

U.S. PATENT DOCUMENTS

2012/0250642 A1* 10/2012 Qu et al. .................. 370/329
2013/0208645 A1* 8/2013 Feng et al. ................ 370/312
2014/0146769 A1* 5/2014 Ahn et al. ................. 370/329

FOREIGN PATENT DOCUMENTS

| WO | WO 2010/095913 A2 | 8/2010 |
| WO | WO 2010/120142 A2 | 10/2010 |
| WO | WO 2010/126273 A2 | 11/2010 |

* cited by examiner

- PCFICH
- PHICH
- PDSCH
- PDCCH region

FIG. 6
layer 1 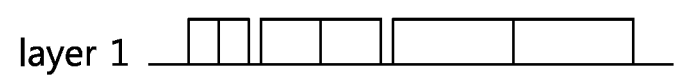
layer 2 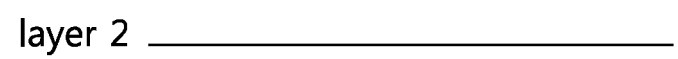
layer 3 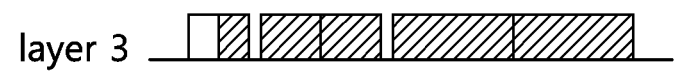
layer 4 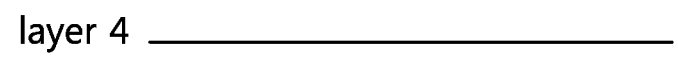

METHOD AND WIRELESS DEVICE FOR MONITORING CONTROL CHANNEL

This application is the National Phase of PCT/KR2012/005744 filed on Jul. 18, 2012, which claims priority under 35 U.S.C. 119(e) to U.S. Provisional Application No. 61/508,696 filed on Jul. 18, 2011, all of which are hereby expressly incorporated by reference into the present application.

BACKGROUND OF THE INVENTION

1. Field of the Invention

The present invention relates to wireless communications, and more particularly, to a method for monitoring a control channel in a wireless communication system, and a wireless device using the method.

2. Related Art

Long term evolution (LTE) based on 3rd generation partnership project (3GPP) technical specification (TS) release 8 is a promising next-generation mobile communication standard. Recently, LTE-advanced (LTA-A) based on 3GPP TS release 10 supporting multiple carriers is under standardization.

A multiple input multiple output (MIMO) technique using a plurality of antennas is introduced also in a mobile communication system. 3GPP LTE supports up to 4 transmit antennas, and 3GPP LTE-A supports up to 8 transmit antennas.

The MIMO technique includes a spatial diversity scheme for increasing transmission reliability by transmitting a data symbol through various channel paths and a spatial multiplexing scheme for simultaneously transmitting a plurality of data symbols through a plurality of transmit antennas. In addition, the MIMO can be divided into single user-MIMO (SU-MIMO) and multi user-MIMO (MU-MIMO).

A capacity of a MIMO channel increases in proportion to the number of antennas. The MIMO channel can be decomposed into independent channels. If the number of transmit (Tx) antennas is Nt, and the number of receive (Rx) antennas is Nr, then the number of independent channels is Ni where Ni≤min{Nt, Mr}. Each independent channel may correspond to a layer. The layer may be defined as an information path which is input to a precoder. A rank is a non-zero eigenvalue of a MIMO channel matrix, and is equal to the number of layers or the number of spatial streams.

In 3GPP/LTE-A, a control channel does not support multiple antenna transmission. The control channel was designed under the premise that it is transmitted through a single antenna.

However, there is a need to consider transmission of a control channel through multiple antennas to cope with an increase in an amount of control information and to increase flexibility of scheduling.

SUMMARY OF THE INVENTION

The present invention provides a method of monitoring a control channel in a multiple antenna system in which a plurality of layers are defined, and a wireless device using the method.

The present invention also provides a method of transmitting a control channel in a multiple antenna system in which a plurality of layers are defined, and a base station using the method.

According to an aspect of the present invention, there is provided a method of monitoring a control channel in a multiple antenna system in which a plurality of layers are defined. The method includes determining by a wireless device a search layer for monitoring the control channel among the plurality of layers; and monitoring by the wireless device the control channel in the search layer.

In the aforementioned aspect of the present invention, the method may further include receiving a reference signal used to demodulate the control channel in the search layer. The reference signal may be spread to a spreading sequence corresponding to the search layer.

In addition, a plurality of search spaces based on a plurality of aggregation levels may be defined in the search layer.

In addition, one search space based on one aggregation level may be defined.

According to another aspect of the present invention, there is provided a wireless device for monitoring a control channel in a multiple antenna system in which a plurality of layers are defined. The wireless device includes a radio frequency (RF) unit for transmitting and receiving a radio signal; and a processor operatively coupled to the RF unit, wherein the processor is configured for: determining by a wireless device a search layer for monitoring the control channel among the plurality of layers; and monitoring by the wireless device the control channel in the search layer.

A multiple antenna system can utilize spatial multiplexing to enable transmission and reception of a control channel.

BRIEF DESCRIPTION OF THE DRAWINGS

FIG. 6 shows control channel monitoring according to an embodiment of the present invention.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a wireless device, a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS) release 8 or 3GPP LTE-advanced (LTE-A) based on 3GPP TS release 10. However, this is for exemplary purposes only, and thus the present invention is also applicable to various wireless communication networks.

The wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
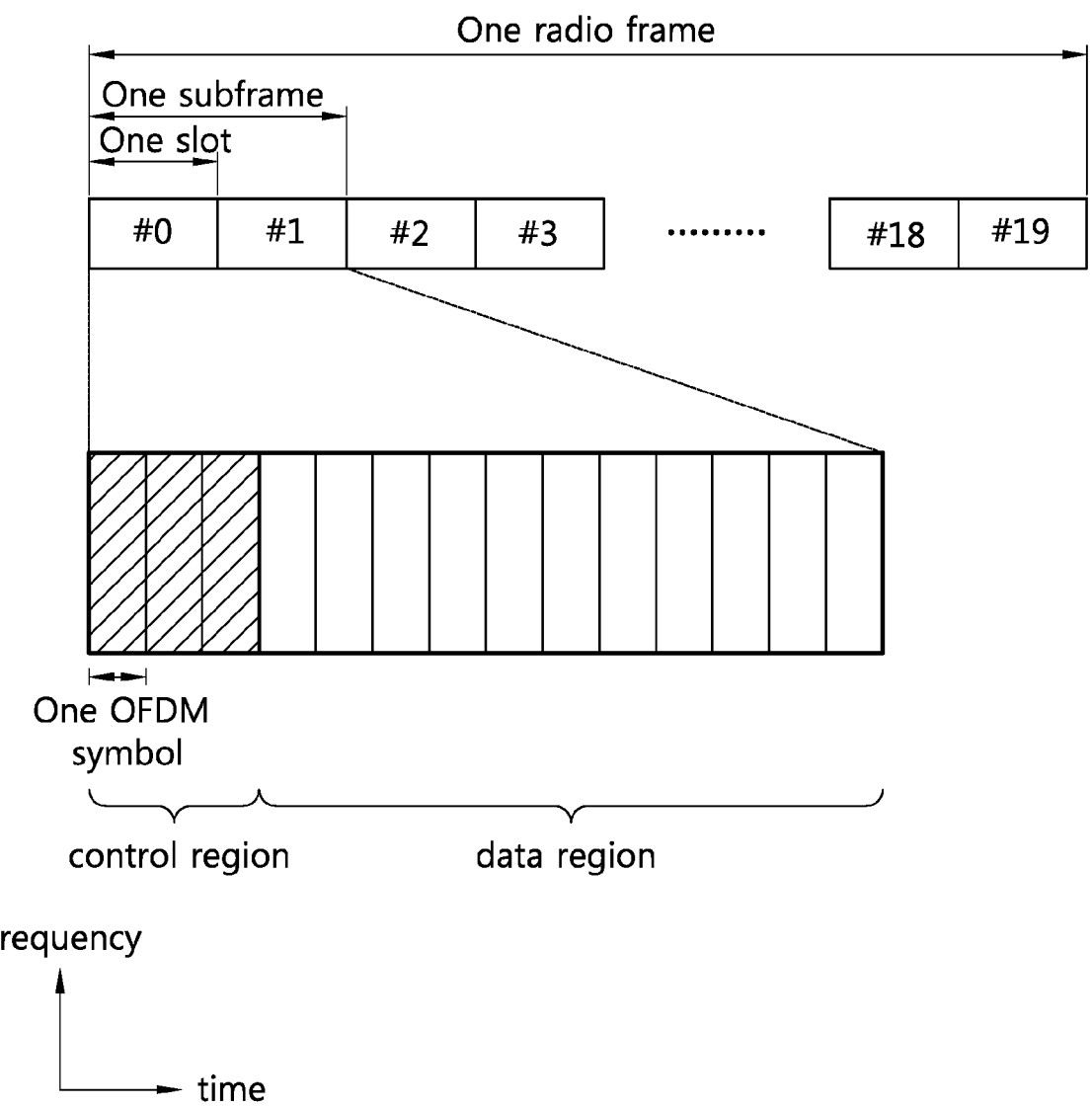
FIG. 1 shows a structure of a downlink (DL) radio frame in 3rd generation partnership project (3GPP) long term evolution-advanced (LTE-A).

FIG. 1 shows a structure of a DL radio frame in 3GPP LTE-A. The section 6 of 3GPP TS 36.211 V10.2.0 (2011 June) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.2.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to first four OFDM symbols of a first slot in the subframe. However, the number of OFDM symbols included in the control region may vary. A physical downlink control channel (PDCCH) and other control channels are allocated to the control region, and a physical downlink shared channel (PDSCH) is allocated to the data region.

Figure 2:
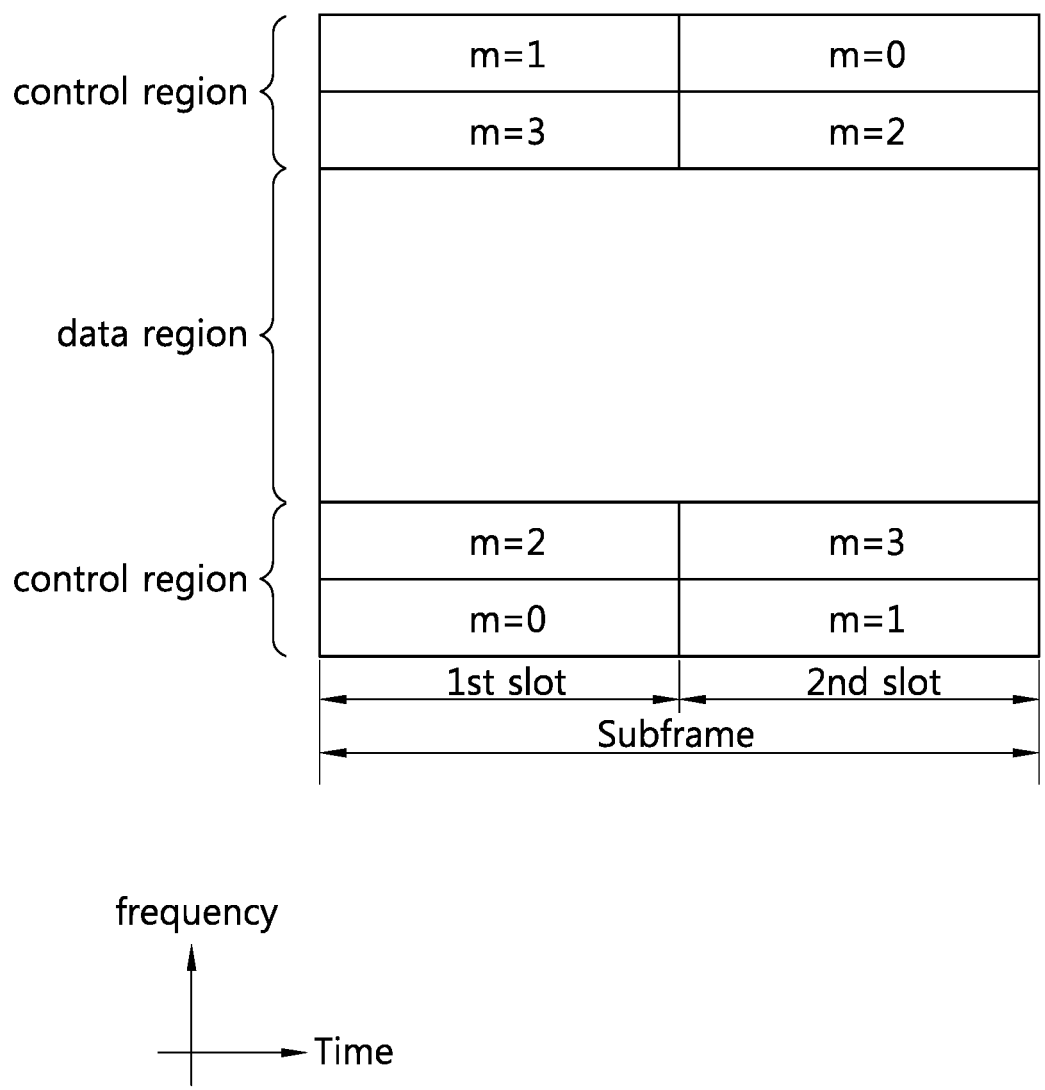
FIG. 2 shows a structure of an uplink (UL) subframe in 3GPP LTE-A.

FIG. 2 shows a structure of a UL subframe in 3GPP LTE-A.

The UL subframe can be divided into a control region and a data region. The control region is a region to which a physical uplink control channel (PUCCH) carrying UL control information is allocated. The data region is a region to which a physical uplink shared channel (PUSCH) carrying user data is allocated.

The PUCCH is allocated in an RB pair in a subframe. RBs belonging to the RB pair occupy different subcarriers in each of a 1st slot and a 2nd slot. m is a location index indicating a logical frequency-domain location of the RB pair allocated to the PUCCH in the subframe. It shows that RBs having the same value m occupy different subcarriers in the two slots.

Now, a DL control channel is described.

As disclosed in 3GPP TS 36.211 V10.2.0, examples of a physical control channel in 3GPP LTE/LTE-A include a physical downlink control channel (PDCCH), a physical control format indicator channel (PCFICH), and a physical hybrid-ARQ indicator channel (PHICH).

The PCFICH transmitted in a first OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

The 3GPP LTE/LTE-A uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of resource elements. According to an association relation of the number of CCEs and the coding rate provided by the CCEs, a PDCCH format and the number of bits of an available PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Figure 3:
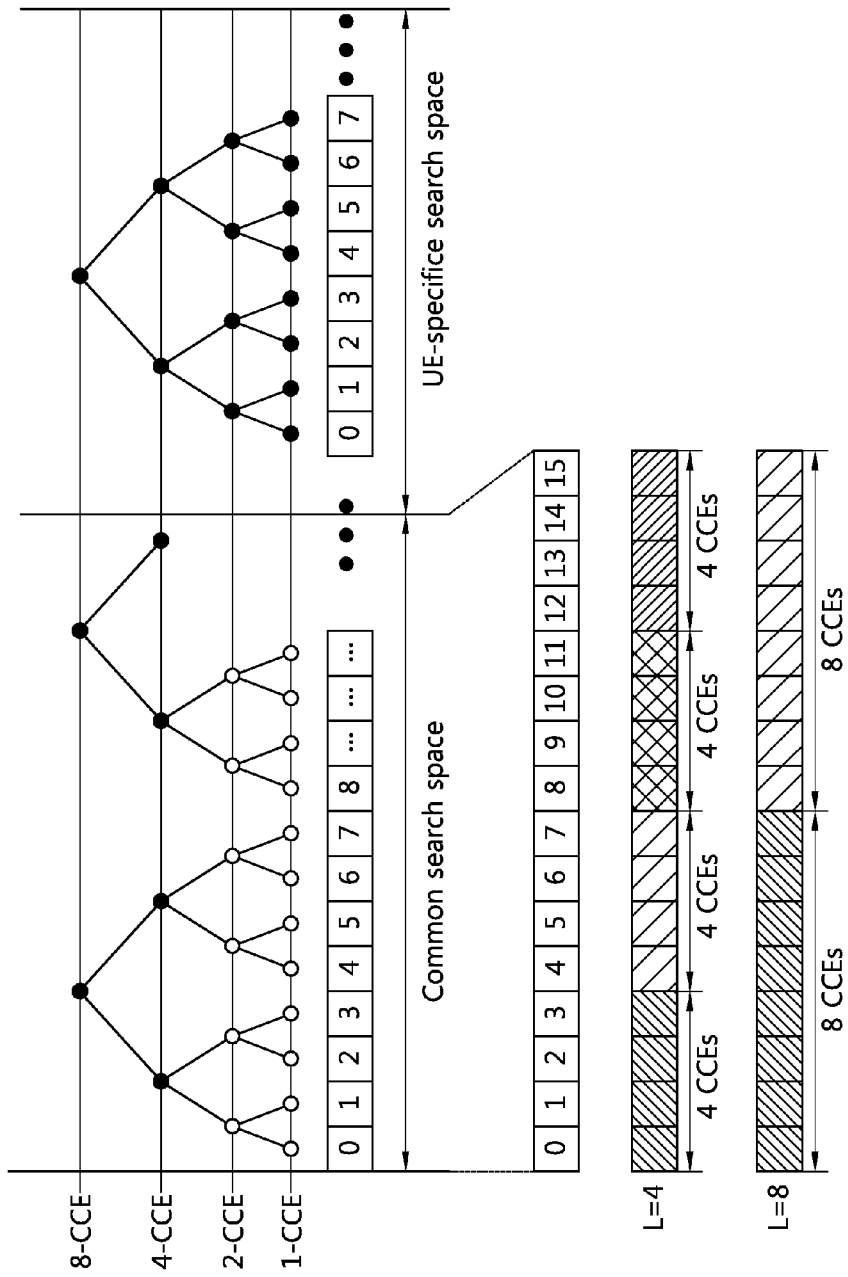
FIG. 3 shows an example of monitoring a physical downlink control channel (PDCCH).

FIG. 3 shows an example of monitoring a PDCCH. The section 9 of 3GPP TS 36.213 V10.2.0 (2011 June) can be incorporated herein by reference.

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing CRC error checking. A wireless device cannot know about a specific position in a control region in which its PDCCH is transmitted and about a specific CCE aggregation or DCI format used for PDCCH transmission.

A plurality of PDCCHs can be transmitted in one subframe. The wireless device monitors the plurality of PDCCHs in every subframe. Monitoring is an operation of attempting PDCCH decoding by the wireless device according to a format of the monitored PDCCH.

The 3GPP LTE uses a search space to reduce a load of blind decoding. The search space can also be called a monitoring set of a CCE for the PDCCH. The wireless device monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, 1A) for carrying UE-specific information can also be transmitted in the common search space. The UE-specific search space supports a PDCCH having a CCE aggregation level of {1, 2, 4, 8}.

Table 1 shows the number of PDCCH candidates monitored by the wireless device.

TABLE 1

| Search Space Type | Aggregation level L | Size [In CCEs] | Number of PDCCH candidates | DCI formats |
|---|---|---|---|---|
| UE-specific | 1 | 6 | 6 | 0, 1, 1A, 1B, 1D, 2, 2A |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

A size of the search space is determined by Table 1 above, and a start point of the search space is defined differently in the common search space and the UE-specific search space. Although a start point of the common search space is fixed irrespective of a subframe, a start point of the UE-specific search space may vary in every subframe according to a UE identifier (e.g., C-RNTI), a CCE aggregation level, and/or a slot number in a radio frame. If the start point of the UE-specific search space exists in the common search space, the UE-specific search space and the common search space may overlap with each other.

In a CCE aggregation level $L \in \{1,2,3,4\}$, a search space $S^{(L)}_k$ is defined as a set of PDCCH candidates. A CCE corresponding to a PDCCH candidate m of the search space $S^{(L)}_k$ is given by Equation 1 below.

$$L \cdot \{(Y_k + m') \bmod \lfloor N_{CCE,k}/L \rfloor\} + i \qquad \text{[Equation 1]}$$

Herein, i=0, 1, ..., L−1, m=0, ..., $M^{(L)}$−1, and $N_{CCE,k}$ denotes the total number of CCEs that can be used for PDCCH transmission in a control region of a subframe k. The control region includes a set of CCEs numbered from 0 to $N_{CCE,k}$−1. $M^{(L)}$ denotes the number of PDCCH candidates in a CCE aggregation level L of a given search space.

If a carrier indicator field (CIF) is set to the wireless device, m'=m+$M^{(L)}n_{cif}$. Herein, $n_{cif}$ is a value of the CIF. If the CIF is not set to the wireless device, m'=m.

In a common search space, $Y_k$ is set to 0 with respect to two aggregation levels L=4 and L=8.

In a UE-specific search space of the aggregation level L, a variable $Y_k$ is defined by Equation 2 below.

$$Y_k = (A \cdot Y_{k-1}) \bmod D \qquad \text{[Equation 2]}$$

Herein, $Y_{-1} = n_{RNTI} \neq 0$, A=39827, D=65537, k=floor($n_s/2$), and $n_s$ denotes a slot number in a radio frame.

In 3GPP LTE/LTE-A, transmission of a DL transport block is performed in a pair of the PDCCH and the PDSCH. Transmission of a UL transport block is performed in a pair of the PDCCH and the PUSCH. For example, the wireless device receives the DL transport block on a PDSCH indicated by the PDCCH. The wireless device receives a DL resource assignment on the PDCCH by monitoring the PDCCH in a DL subframe. The wireless device receives the DL transport block on a PDSCH indicated by the DL resource assignment.

Figure 4:
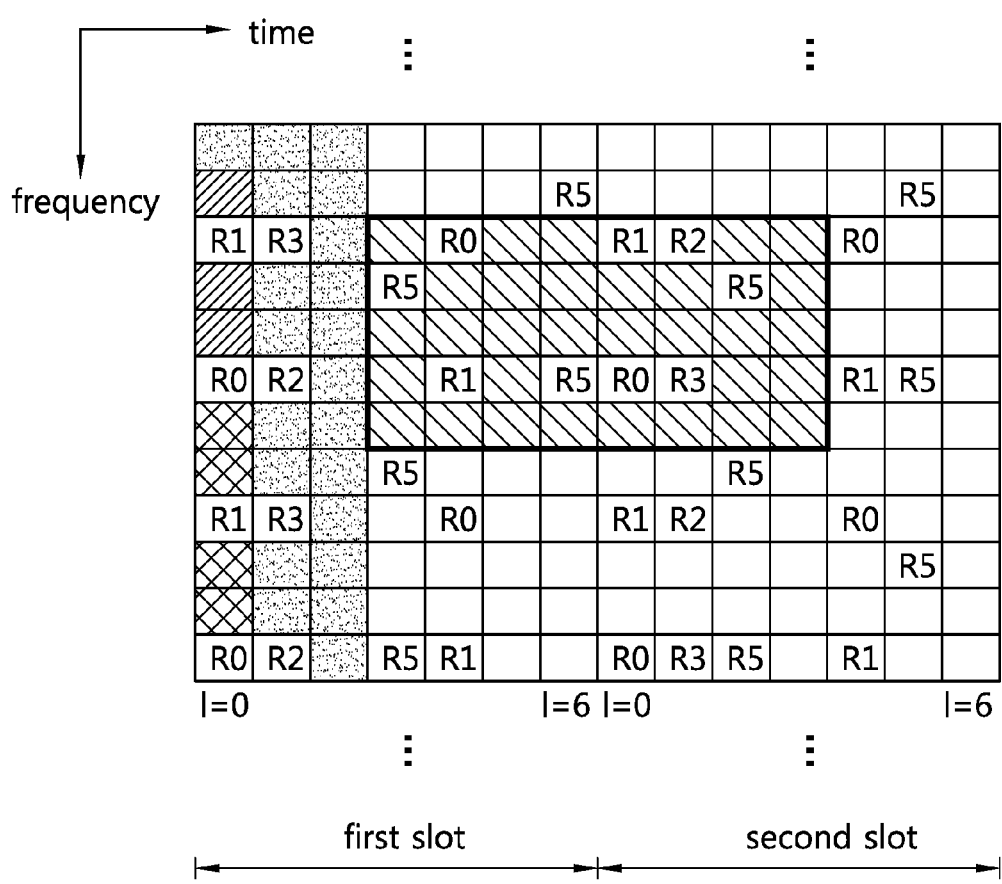
FIG. 4 shows an example of displaying a reference signal and a control channel in a DL subframe.

FIG. 4 shows an example of displaying a reference signal and a control channel in a DL subframe.

A control region includes first three OFDM symbols, and a data region in which a PDSCH is transmitted includes the remaining OFDM symbols.

A PCFICH, a PHICH, and/or a PDCCH are transmitted in the control region. A control format indictor (CFI) of the PCFICH indicates three OFDM symbols. A region excluding a resource in which the PCFICH and/or the PHICH are transmitted in the control region is a PDCCH region in which the UE monitors the PDCCH.

Various reference signals are transmitted in the subframe. A cell-specific reference signal (CRS) may be received by all UEs in a cell, and is transmitted across a full downlink frequency band. In FIG. 4, 'R0' indicates a resource element (RE) used to transmit a CRS for a first antenna port, 'R1' indicates an RE used to transmit a CRS for a second antenna port, 'R2' indicates an RE used to transmit a CRS for a third antenna port, and 'R3' indicates an RE used to transmit a CRS for a fourth antenna port.

An RS sequence $r_{l,ns}(m)$ for a CRS is defined as follows.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{[Equation 3]}$$

Herein, $m=0, 1, \ldots, 2N_{maxRB}-1$. $N_{maxRB}$ is the maximum number of RBs. ns is a slot number in a radio frame. l is an OFDM symbol index in a slot.

A pseudo-random sequence $c(i)$ is defined by a length-31 gold sequence as follows.

$$c(n)=(x_1(n+Nc)+x_2(n+Nc)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{[Equation 4]}$$

Herein, Nc=1600, and a first m-sequence is initialized as $x_1(0)=1$, $x_1(n)=0$, $m=1, 2, \ldots, 30$.

A second m-sequence is initialized as $c_{init}=2^{10}(7(ns+1)+l+1)(2N^{cell}_{ID}+1)+2N^{cell}_{ID}+N_{CP}$ at a start of each OFDM symbol. $N^{cell}_{ID}$ is a physical cell identifier (PCI). $N_{CP}=1$ in a normal CP case, and $N_{CP}=0$ in an extended CP case.

A UE-specific reference signal (URS) is transmitted in the subframe. Whereas the CRS is transmitted in the entire region of the subframe, the URS is transmitted in a data region of the subframe and is used to demodulate the PDSCH. In FIG. 4, 'R5' indicates an RE used to transmit the URS. The URS is also called a dedicated reference signal (DRS) or a demodulation reference signal (DM-RS).

The URS is transmitted only in an RB to which a corresponding PDSCH is mapped. Although R5 is indicated in FIG. 4 in addition to a region in which the PDSCH is transmitted, this is for indicating a location of an RE to which the URS is mapped.

The URS is used only by a wireless device which receives a corresponding PDSCH. A reference signal (RS) sequence $r_{ns}(m)$ for the URS is equivalent to Equation 3. In this case, $m=0, 1, \ldots, 12N_{PDSCH,RB}-1$, and $N_{PDSCH,RB}$ is the number of RBs used for transmission of a corresponding PDSCH. A pseudo-random sequence generator is initialized as $c_{init}=$(floor(ns/2)+1)$(2N^{cell}_{ID}+1)2^{16}+n_{RNTI}$ at a start of each subframe. $n_{RNTI}$ is an identifier of the wireless device.

The aforementioned initialization method is for a case where the URS is transmitted through the single antenna, and when the URS is transmitted through multiple antennas, the pseudo-random sequence generator is initialized as $c_{init}=$(floor(ns/2)+1)$(2N^{cell}_{ID}+1)2^{16}n_{SCID}$ at a start of each subframe. $n_{SCID}$ is a parameter acquired from a DL grant (e.g., a DCI format 2B or 2C) related to PDSCH transmission.

The URS supports multiple input multiple output (MIMO) transmission. According to an antenna port or a layer, an RS sequence for the URS may be spread into a spread sequence as follows.

TABLE 2

| Layer | [w(0) w(1) w(2) w(3)] |
|---|---|
| 1 | [+1 +1 +1 +1] |
| 2 | [+1 −1 +1 −1] |
| 3 | [+1 +1 +1 +1] |

TABLE 2-continued

| Layer | [w(0) w(1) w(2) w(3)] |
|---|---|
| 4 | [+1 −1 +1 −1] |
| 5 | [+1 +1 −1 −1] |
| 6 | [−1 −1 +1 +1] |
| 7 | [+1 −1 −1 +1] |
| 8 | [−1 +1 +1 −1] |

A layer may be defined as an information path which is input to a precoder. A rank is a non-zero eigenvalue of a MIMO channel matrix, and is equal to the number of layers or the number of spatial streams. The layer may correspond to an antenna port for identifying a URS and/or a spread sequence applied to the URS.

Figure 5:
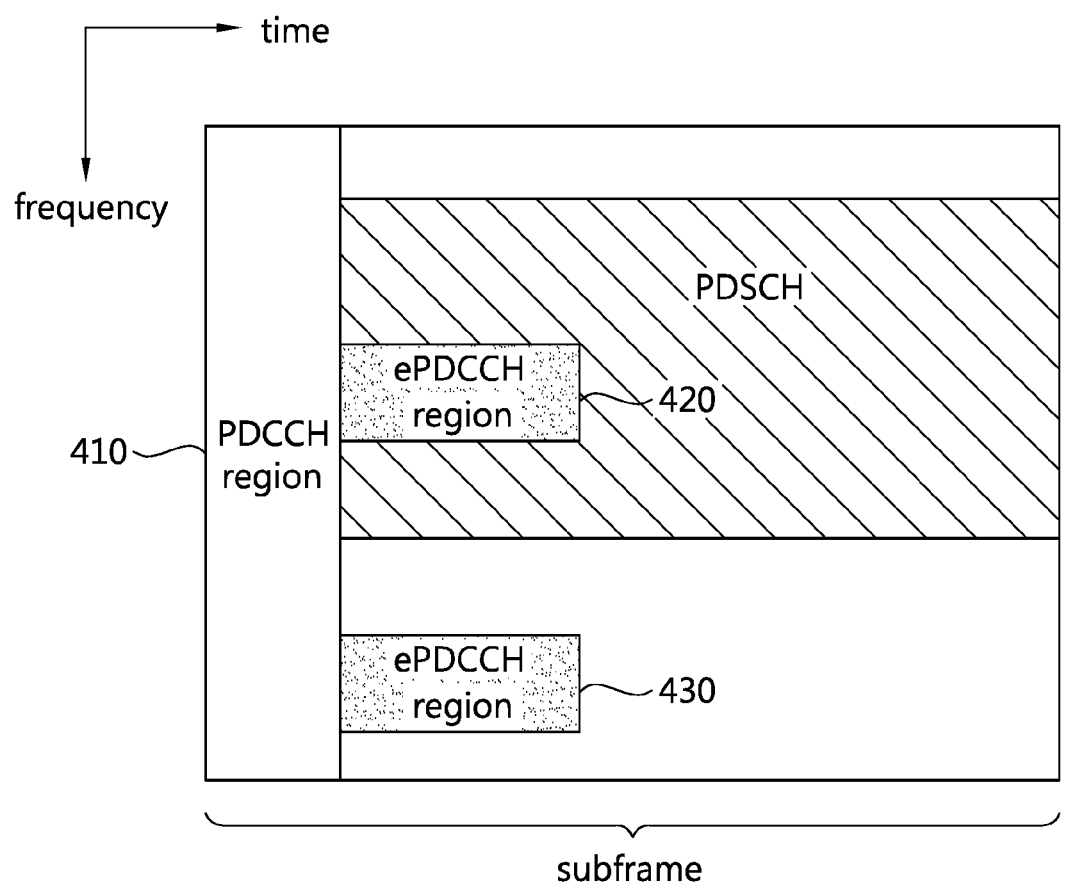
FIG. 5 shows an example of a subframe having an extended PDCCH.

FIG. 5 shows an example of a subframe having an extended PDCCH.

The legacy 3GPP LTE/LTE-A system has a limitation in that a PDCCH which carries a variety of control information such as DL/UL scheduling, etc., is transmitted only in a control region of a subframe. Therefore, there is ongoing discussion on the introduction of an extended-PDCCH (ePDCCH) which is more flexibly scheduled. The ePDCCH is also called an enhanced-PDCCH.

The subframe includes a PDCCH region 410 for monitoring a PDCCH and one or more ePDCCH regions 420 and 430 in which the ePDCCH is monitored.

The PDCCH region 410 is located in up to first four OFDM symbols of the subframe, whereas the ePDCCH regions 420 and 430 may be flexibly scheduled in a data region.

In the PDCCH region 410, a PDCCH may be demodulated according to a CRS. In the ePDCCH regions 420 and 430, the ePDCCH may be demodulated according to a URS. The URS may be transmitted in corresponding ePDCCH regions 420 and 430.

The ePDCCH regions 420 and 430 may use blind decoding to monitor the ePDCCH. Alternatively, the ePDCCH may not use the blind decoding. A UE may know in advance a location or the number of ePDCCHs in the ePDCCH regions 420 and 430 and detect the ePDCCH at a designated location.

The ePDCCH regions 420 and 430 may be monitored by one UE, a UE group, or UEs in a cell. If a specific UE monitors the ePDCCH regions 420 and 430, $n_{RNTI}$ or $n_{SCID}$ which is used to initialize a pseudo-random sequence generator of the URS may be obtained on the basis of an identifier of the specific UE. If a UE group monitors the ePDCCH regions 420 and 430, $n_{RNTI}$ or $n_{SCID}$ which is used to initialize a pseudo-random sequence generator of the URS may be obtained on the basis of an identifier of the UE group.

When the ePDCCH regions 420 and 430 are transmitted through multiple antennas, the same precoding as that of the URS may be applied to the ePDCCH regions 420 and 430.

Since the PDSCH supports multiple antenna transmission, an ePDCCH transmitted in the PDSCH region also supports the multiple antenna transmission. That is, the ePDCCH region may be transmitted through a plurality of layers in the same RB by using one wireless device (this is called SU-MIMO), or may be transmitted through a plurality of layers in the same RB by using a plurality of wireless devices (this is called MU-MIMO). Orthogonality between URSs used to demodulate the e-PDCCH may be acquired in a frequency domain, a code domain, and/or a time domain.

Hereinafter, it is proposed a method of configuring a search space for monitoring an ePDCCH through a plurality of layers. Although MU-MIMO in which each layer is mapped to a different wireless device is assumed for clarity, the present invention is also easily applicable to SU-MIMO in which all layers are mapped to one wireless device.

Although the number of layers is 4 hereinafter for example, the number of layers may be greater than or equal to 2.

An aggregation level is a resource unit for monitoring an ePDCCH. For example, when one CCE is a minimum resource for the ePDCCH, the aggregation level may be defined as a multiple of 2 (e.g., 1, 2, 4, 8, . . . ) of a CCE, and a search space may be defined according to each aggregation level.

The search space includes at least any one of a common search space and a UE-specific search space.

Hereinafter, it is proposed that a search space in which a wireless device must attempt decoding to detect an ePDCCH is configured for at least one of a plurality of layers. A layer in which the search space is configured is called a search layer. A corresponding aggregation level may be defined in the search layer.

FIG. 6 shows control channel monitoring according to an embodiment of the present invention.

For each wireless device, one search space can be configured at one time point. The search layer may be reported by a BS to each wireless device through RRC/MAC signaling or a PDCCH. In the example of FIG. 6, a layer 1 is assigned to a first wireless device as the search layer, and a layer 3 is assigned to a second wireless device as the search layer.

The BS may transmit an ePDCCH of the first wireless device in the layer 1, and may transmit an ePDCCH of the second wireless device in the layer 3. In the layer 1, the first wireless device monitors the ePDCCH. In the layer 3, the second wireless device monitors the ePDCCH.

Although it is shown that an aggregation level L={1, 2, 4} is configured for example, a size or the number of aggregation levels are for exemplary purposes only.

In addition, the aggregation level defined in the layer 1 and the layer 3 may be different. For example, L={1, 2, 4} may be defined in the layer 1, and L={2, 4, 8} may be defined in the layer 3.

Figure 7:
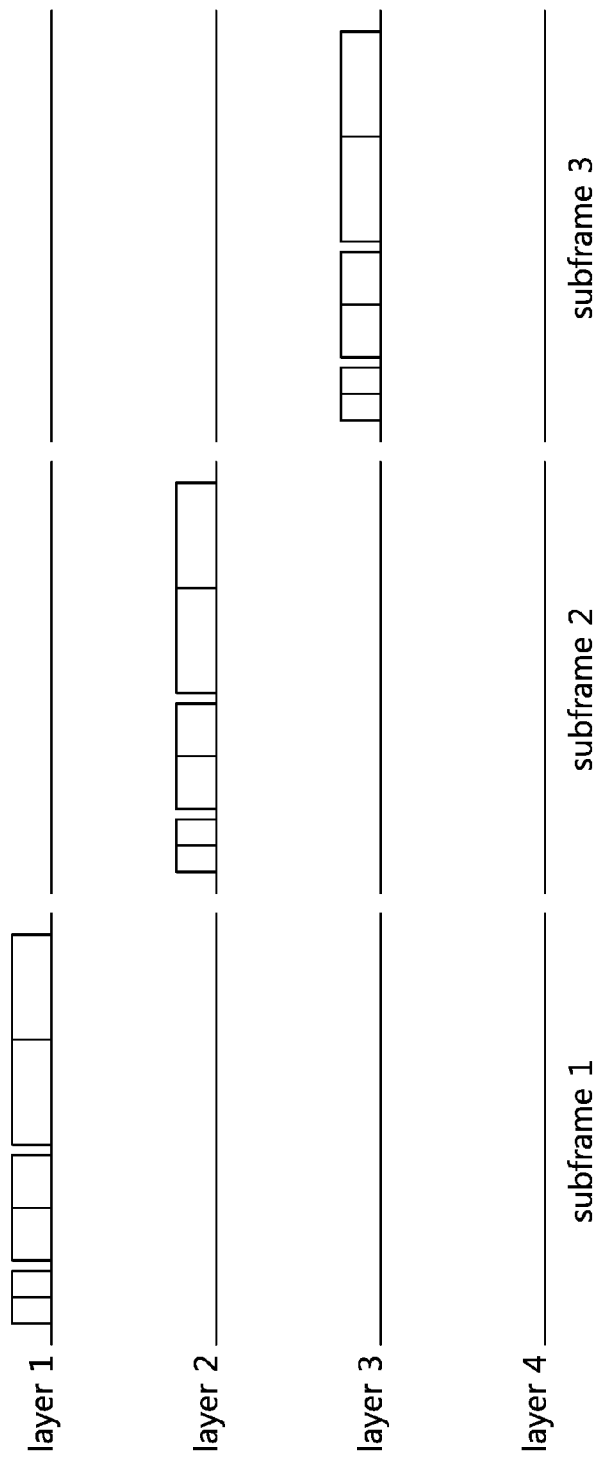
FIG. 7 shows control channel monitoring according to another embodiment of the present invention.

FIG. 7 shows control channel monitoring according to another embodiment of the present invention.

A search space for one wireless device at one time point may be configured in one search layer. In the example of FIG. 7, a search layer of a first wireless device is configured for a layer 1 in a subframe 1, a layer 2 in a subframe 2, and a layer 3 in a subframe 3.

The search layer for each wireless device may be determined according to a pattern. The pattern may include information regarding a subframe number at which the search layer is defined and a layer corresponding to the search layer among a plurality of layers. The pattern may be predetermined, or may be reported by a BS to a wireless device through RRC signaling.

The pattern may be determined based on an identifier of a wireless device, a cell identifier, a subframe number and/or a wireless frame number.

Figure 8:
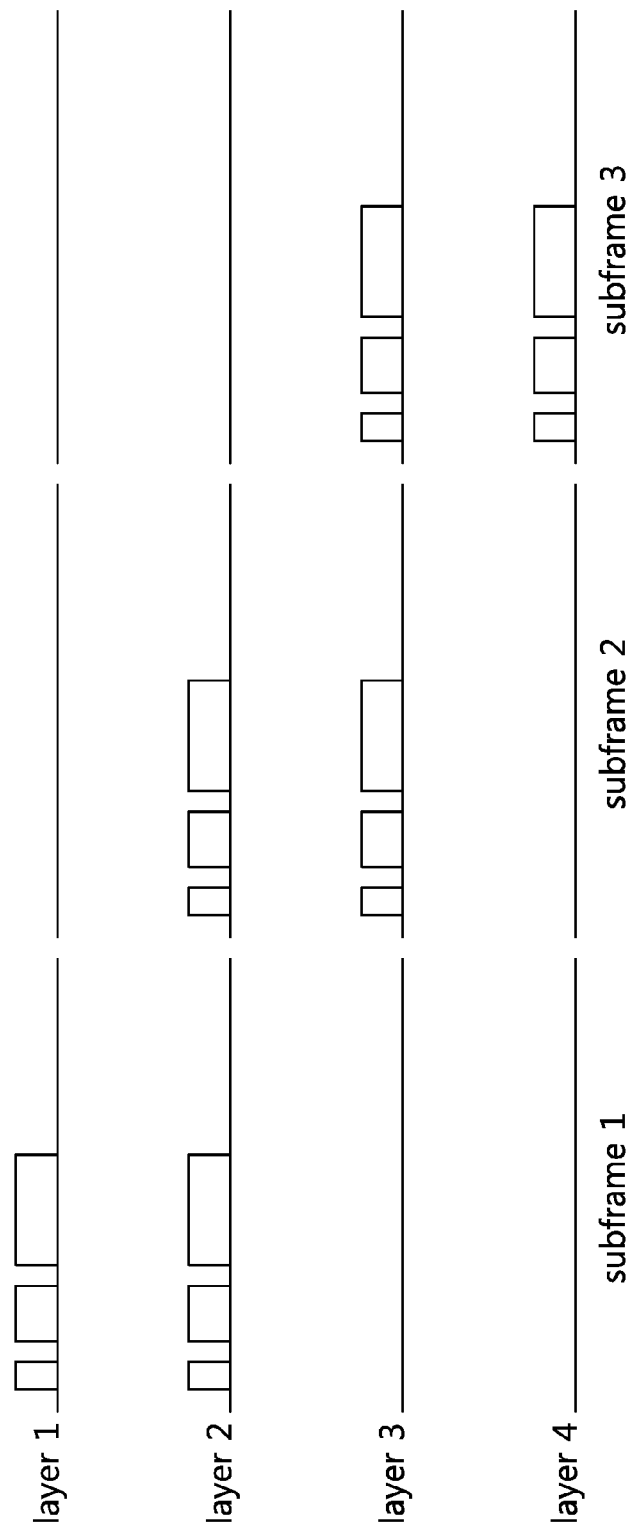
FIG. 8 shows control channel monitoring according to another embodiment of the present invention.

FIG. 8 shows control channel monitoring according to another embodiment of the present invention.

A plurality of search layers may be configured for each wireless device at one time point. The search layer may be reported by a BS to each wireless device through RRC/MAC signaling or a PDCCH. A plurality of search layers are configured for each wireless device, and a UE performs control channel monitoring for all aggregation levels in each search layer. In this case, the search layer may change according to a pattern in each subframe.

Figure 9:
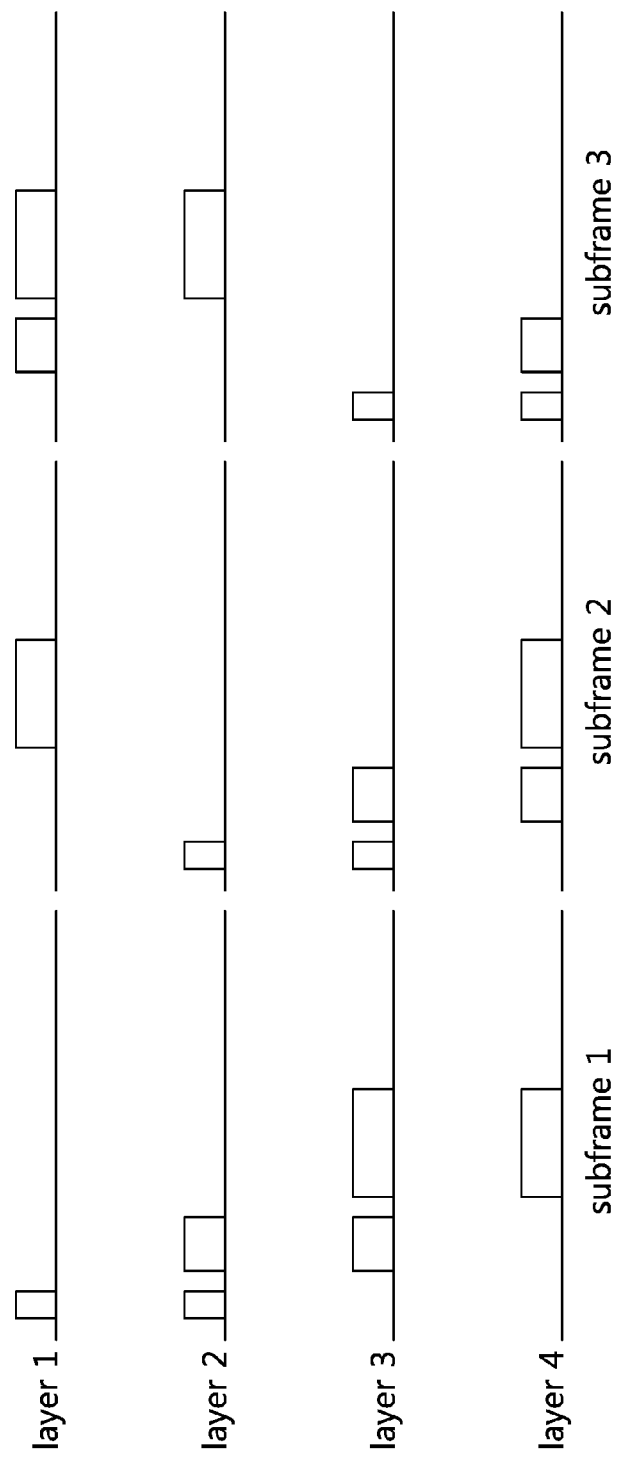
FIG. 9 shows control channel monitoring according to another embodiment of the present invention.

FIG. 9 shows control channel monitoring according to another embodiment of the present invention.

A plurality of search spaces for the same aggregation level are configured for different search layers at one time point. A search space for a different aggregation level may be configured for a different search layer. If the number of search layers is not enough, a search space for some aggregation levels may overlap in the same search layer.

In a subframe 1, a wireless device may monitor an ePDCCH in a layer 1 for L={1}, monitor an ePDCCH in a layer 2 for L={1, 2}, monitor an ePDCCH in a layer 2 for L={2, 4}, and monitor an ePDCCH for L={4}.

For each subframe, a size or the number of aggregation levels corresponding to search layers may vary according to a panel. The pattern may be determined based on an identifier of a wireless device, a cell identifier, a subframe number and/or a wireless frame number.

Figure 10:
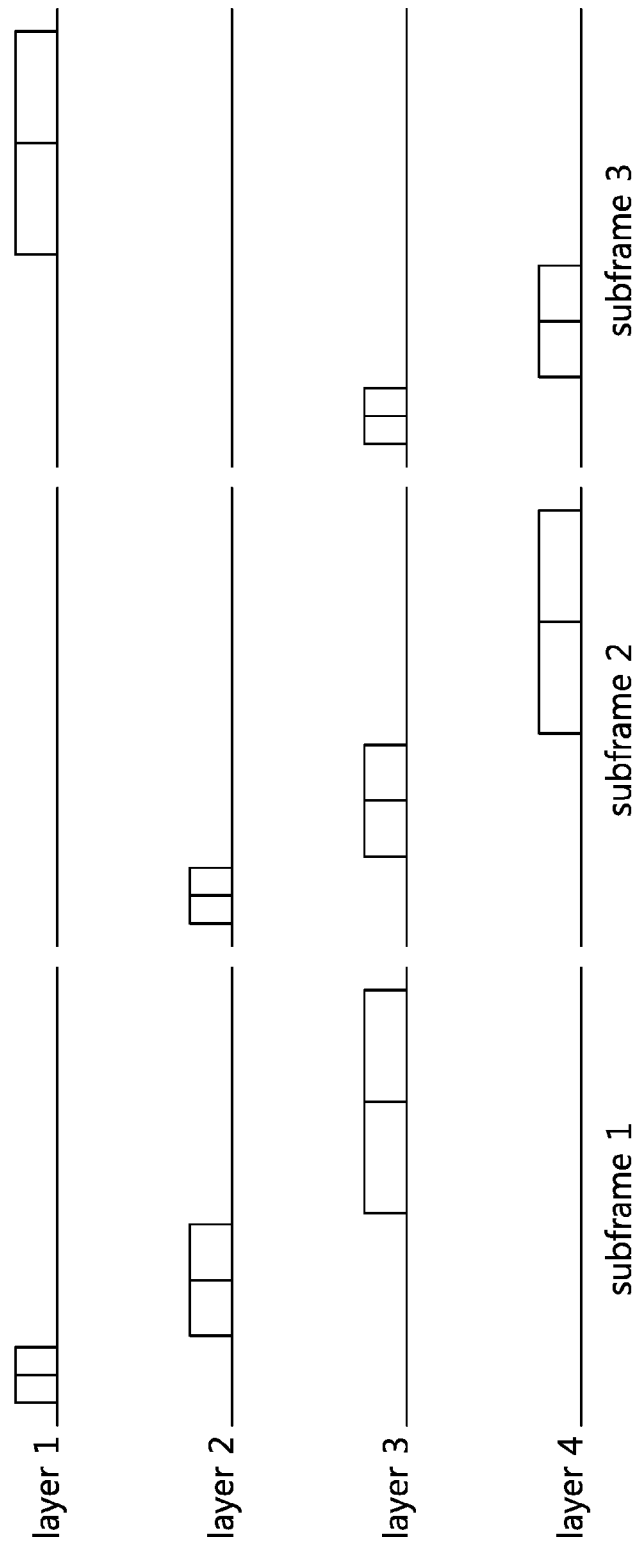
FIG. 10 shows control channel monitoring according to another embodiment of the present invention.

FIG. 10 shows control channel monitoring according to another embodiment of the present invention.

Only one aggregation level may be defined in a search layer of a wireless device at one time point. Different aggregation levels may be defined for a plurality of search layers.

In a subframe 1, three layers are configured for the wireless device as a search layer. Monitoring is performed only for an aggregation level 1 in a layer 1. Monitoring is performed only for an aggregation level 2 in a layer 2. Monitoring is performed only for an aggregation level 4 in a layer 3.

The search layer depending on each aggregation level may vary depending on a pattern determined for each subframe. The pattern may be determined based on an identifier of a wireless device, a cell identifier, a subframe number and/or a wireless frame number.

In the embodiments of FIG. 6 to FIG. 10, the search layer may include a UE-specific search space. A common search space may be configured only in a specific layer. The search layer in which the common search space is configured may be fixed, or may be reported by a BS to each wireless device through RRC signaling.

If an ePDCCH schedules a PDSCH, the PDSCH scheduled through the ePDCCH may be transmitted in the same layer as a layer in which the ePDCCH is transmitted.

The search layer may be applied to SU-MIMO or MU-MIMO. The search layer to which the SU-MIMO or MU-MIMO is applied may be reported by the BS to each wireless device.

An aggregation level in the search layer for the SU-MIMO may be smaller in its size or total number than that of an aggregation level in a search layer for the MU-MIMO. For example, the aggregation level in the search layer for the SU-MIMO may be {1, 2, 4}, and the aggregation level in the search layer for the MU-MIMO may be {1, 2, 4, 8, 16}.

Figure 11:
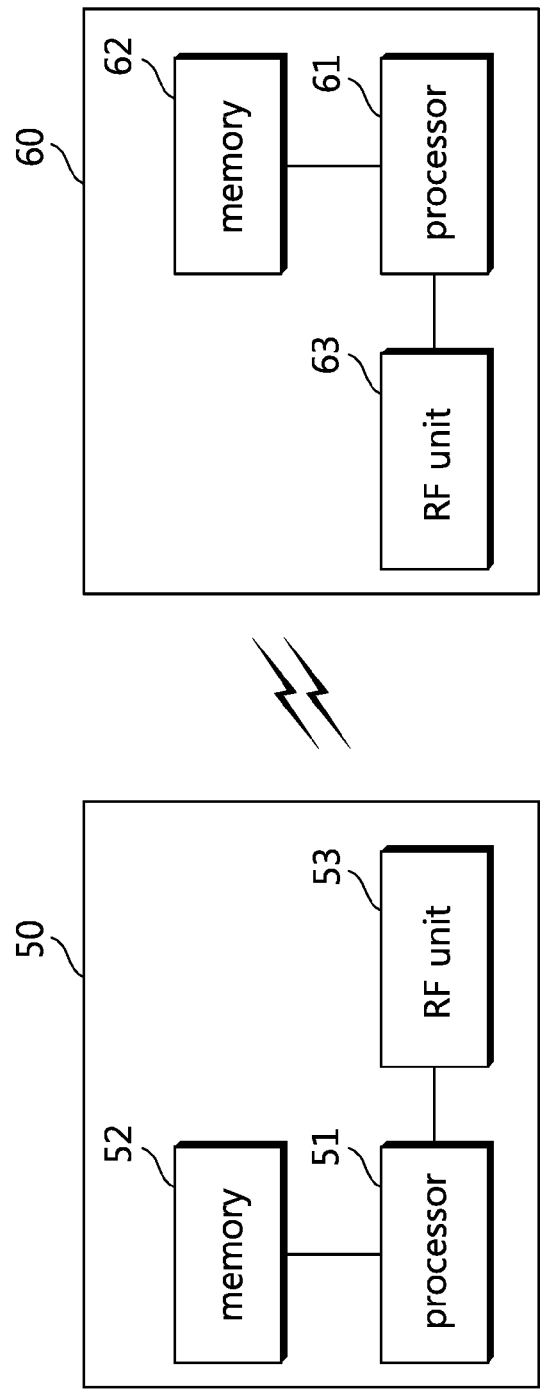
FIG. 11 is a block diagram of a wireless communication system according to an embodiment of the present invention.

FIG. 11 is a block diagram of a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. In the aforementioned embodiment, an operation of the BS may be implemented by the processor 51.

A wireless device 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. In the aforementioned embodiment, an operation of the wireless device may be implemented by the processor 61.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method of monitoring a physical control channel in a multiple antenna system, the method comprising:
   determining, by a wireless device, a search layer associated with an antenna used for the physical control channel among a plurality of search layers based on a pre-defined pattern, wherein the pre-defined pattern is determined based on a number of subframes carrying the physical control channel; and
   monitoring, by the wireless device, the physical control channel in the search layer, wherein the physical control channel is received via an orthogonal frequency division multiplexing (OFDM) symbol carrying a shared data channel, and the physical control channel includes scheduling information for the shared data channel,
   wherein the pre-defined pattern is determined by the wireless device without using control information received from a base station.

2. The method of claim 1, further comprising:
   receiving a reference signal used to demodulate the physical control channel in the search layer, wherein the reference signal is spread to a spreading sequence corresponding to the search layer.

3. The method of claim 2, wherein the reference signal is used to demodulate the shared data channel.

4. The method of claim 1, wherein a plurality of search spaces based on a plurality of aggregation levels are defined in the search layer.

5. The method of claim 1, wherein one search space based on one aggregation level is defined in the search layer.

6. The method of claim 1, wherein a first search layer determined for a first subframe is different from a second search layer determined for a second subframe, which directly follows the first subframe.

7. A wireless device for monitoring a physical control channel in a multiple antenna system, the wireless device comprising:
   a radio frequency (RF) unit configured to transmit and receive a radio signal; and
   a processor operatively coupled to the RF unit, the processor being configured to:
      determine a search layer associated with an antenna used for the physical control channel among a plurality of search layers based on a pre-defined pattern, wherein the pre-defined pattern is determined based on a number of subframes carrying the physical control channel, and
      monitor the physical control channel in the search layer, wherein the physical control channel is received via an orthogonal frequency division multiplexing (OFDM) symbol carrying a shared data channel, and the physical control channel includes scheduling information for the shared data channel,
   wherein the pre-defined pattern is determined by the processor without using control information received from a base station.

8. The wireless device of claim 7, wherein the processor receives a reference signal used to demodulate the physical control channel in the search layer, and
   wherein the reference signal is spread to a spreading sequence corresponding to the search layer.

9. The wireless device of claim 8, wherein the reference signal is used to demodulate the shared data channel.

10. The wireless device of claim 7, wherein a plurality of search spaces based on a plurality of aggregation levels are defined in the search layer.

11. The wireless device of claim 7, wherein one search space based on one aggregation level is defined in the search layer.

12. The wireless device of claim 7, wherein a first search layer determined for a first subframe is different from a second search layer determined for a second subframe, which directly follows the first subframe.

* * * * *